J. E. WISNER.
Horse Hay-Rakes.
No. 6,077. Reissued Oct. 6, 1874.
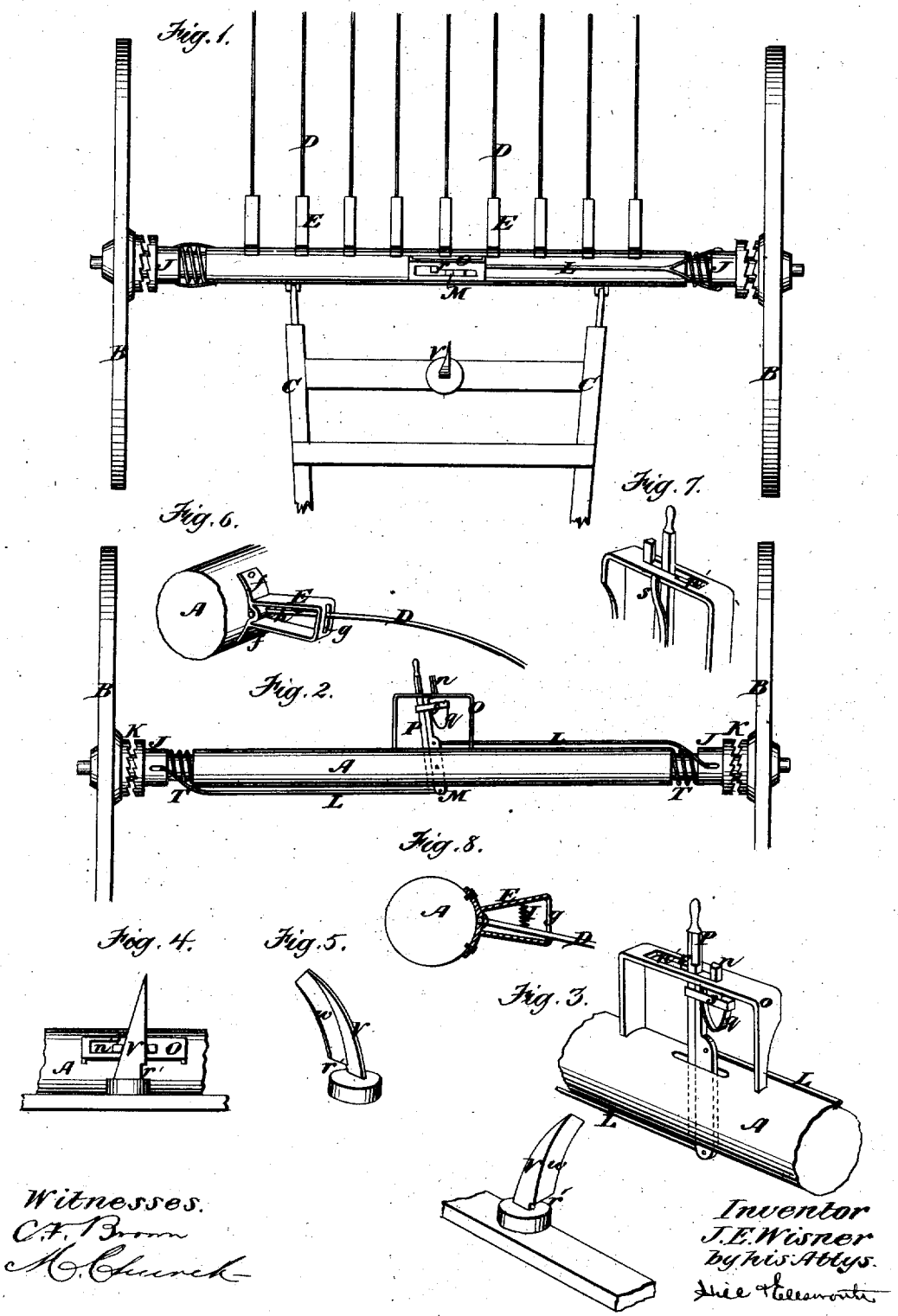
Witnesses.
C. A. Brown
M. Church
Inventor
J. E. Wisner
by his Attys.
Hill & Greenwood
THE GRAPHIC CO. PHOTO-LITH. 39 & 41 PARK PLACE, N.Y.

UNITED STATES PATENT OFFICE.

JAMES E. WISNER, OF FRIENDSHIP, NEW YORK.

IMPROVEMENT IN HORSE HAY-RAKES.

Specification forming part of Letters Patent No. 121,035, dated November 14, 1871; reissue No. 6,077, dated October 6, 1874; application filed June 20, 1874.

CASE B.

*To all whom it may concern:*

Be it known that I, JAMES E. WISNER, of Friendship, in the county of Allegany and State of New York, have invented an Improved Horse Hay-Rake; and I do hereby declare the following to be a full, clear, and exact description of the same, reference being had to the accompanying drawing forming part of this specification, in which—

Figure 1 is a plan view of my improved rake. Fig. 2 is a front elevation, with the shafts removed. Fig. 3 is a perspective view of portions of the dumping mechanism. Figs. 4 and 5 are perspective views of detached parts. Fig. 6 is a perspective view of one of the teeth, showing its application to the rake. Fig. 7 is a rear perspective view of the dumping mechanism; and Fig. 8 is a longitudinal section of one of the loops, by which the teeth are attached to the axle or rake-head.

Similar letters of reference in the accompanying drawing denote the same parts.

This invention belongs to that class of two-wheeled horse hay-rakes in which the hay is dumped by the power of the team, at the will of the operator, and the rake is automatically reset, and more particularly to that subdivision of said class in which the dumping is effected by means of a combination of ratchets on the hubs of the draft-wheels, sliding clutches on the axles capable of engaging with the hub-ratchets, and a hand or foot lever near the driver's seat, or middle of the main axle, by which the clutches can be made at any moment to engage with the hub-ratchets, and thereby lift the rake-teeth and dump the hay.

My object is to improve the construction and operation of rakes of this class, so as to cheapen their manufacture, to render them more durable and less liable to get out of order, and to enable them to perform their work with less expenditure of power, with more certainty and efficiency of operation, and with greater ease and convenience to the attendant.

In most rakes of this class, which automatically reset the rake-teeth after the hay is dumped, the resetting is effected by causing a lever or other part connected with the clutches to move toward and strike against an incline in the line of its movement, by which such lever or other part is gradually displaced as the rake advances, thereby gradually withdrawing the clutches until they cease to engage with the ratchets, when the rake-teeth drop back to their former position.

My invention consists, first, in dumping the hay from the rake-teeth automatically by an instantaneous movement of mechanism arranged on the axle, substantially as hereinafter described; and secondly, in the means employed for attaching the teeth to the axle of the rake, as I will now proceed to describe.

In the accompanying drawing, A is the axle; B, the wheels of the rake; and C, the shafts, hinged to the axle in any convenient manner. D are the metal or wire teeth applied to the rear of the axle in the following manner: E are metal loops projecting from the rear of the axle, to which they are secured by bolts or screws passing through the arms *f*. The outer end of each loop is formed with a vertical slot, *g*, through which the tooth is passed, and the inner end of the latter is bent laterally at right angles, to enter an opening formed in the case *h* of the loop next the axle. The base of the loop around the opening is raised somewhat, so that the end of the tooth shall have sufficient room next the axle to turn freely. I are springs, which may be spiral, elliptical, or rubber, inserted within the loop above the teeth, and serve to hold the latter against the ground with a yielding pressure.

The employment of the springs I is not absolutely essential, as the teeth may be allowed to play freely up and down in the slotted loops.

By this method of attaching the teeth they can be easily applied and removed separately at any time.

The mechanism for dumping the teeth is constructed and operates as follows: J J are sliding clutches mounted upon the ends of the axles between the wheels, and adapted to engage with ratchets or clutches K K affixed to the hubs of the latter. The sliding clutches are connected, by means of rods L L above and below the axle, with a short lever or catch-bar, M, which is pivoted vertically within a slot formed in the axle, as shown in Fig.

3. The lower end of the catch-bar is pivoted to one of the rods L, while the upper rod is pivoted to the bar immediately above the axle, as shown, both rods being about the same distance from the pivot of the catch-bar. The upper end of the catch-bar is formed with a lateral arm, *n*, and is adapted to work within a slot, *n'*, formed in the metallic frame O, mounted upon the axle. P is a short hand-lever, passing through the slot in the axle, and pivoted, at its lower end, to the lower end of the catch-bar. The upper end of the lever is held against the catch-bar by means of a spring, *q*, one end of which bears against the catch-bar, and the opposite end against a loop or stirrup, *s'*, passing around both bar and lever.

When the sliding clutches are disengaged from the wheels, the lever and catch-bar occupy the position shown in Fig. 2—that is to say, with the lever resting against a shoulder, *r*, at one side of the slot formed in the frame O, where it is held by the spring *s*, one end of which is attached to the lever, and the opposite end bears against the back of the frame O, as shown in Fig. 7.

When it is desired to raise the teeth for the purpose of dumping the hay into a windrow, the operator pushes the hand-lever P forward slightly to clear it from the shoulder, and so that both lever and catch-bar shall enter the narrow part of the slot *n'*. As soon as the lever is released the coiled springs T, which are interposed between the sliding clutches and a shoulder formed upon the axle, move said clutches outward to engage with the clutches K upon the wheel-hubs, so that the wheels shall rotate the axle, and thus lift the rake-teeth.

V is a cam-guide, mounted upon the shafts C, or a cross-bar of the same, in the path of the lever and catch-bar. As the axle continues to rotate the point of the cam-guide passes between the hand-lever and the lateral projection *n* of the catch-bar, guiding the hand-lever down its inclined side against the tension of the spring *q*, until said lever again engages with the shoulder *r* of the upright frame. The spring *q* admits of this movement of the hand-lever without affecting the position of the catch-bar, which moves down the opposite side of the cam-guide, being locked thereby to hold the clutches in engagement, and simultaneously with the return of the lever to the shoulder *r*, the catch-bar passing through a notch, *r'*, at the lower end of the guide-flange *w*, which is formed upon the straight side of the cam, and is thrown by the spring *q* again in contact with the hand-lever, clearing the flange *w*, and instantaneously disengaging the clutches J K to allow the rake-teeth to fall by their own gravity. This instantaneous release of the rake-teeth and axle occurs just as the former is in the proper position to dump the hay; and the whole operation is performed without that gradual and continued strain incident to the devices ordinarily employed for dumping a horse hay-rake.

Having thus described my invention, what I claim as new is—

1. The combination, substantially as described, of the draft-wheels, provided with ratchets on their hubs, the sliding clutches on the axle rake-head, a shipping-lever connected with the clutches, a lock for holding the clutches in engagement, an automatic unlocking device, and a spring for instantaneously disengaging the clutches.

2. The combination of the sliding clutches J, connecting-rods L, the catch-bar M, and the cam-guides for the purpose of positively holding the clutches engaged with the wheels until the proper moment of discharge, substantially as described.

3. In combination with the spring catch-bar M, and the cam-guide having the inclined face and the recessed flange, the hand-lever P, substantially as described, for the purpose specified.

4. In combination with the spring catch-bar M, hand-lever P, and the cam-guide, the slotted and shouldered frame O, substantially as described, for the purpose specified.

5. In combination with the hand-lever P, the catch-bar M, and the slotted and shouldered frame O, the spring *s*, substantially as described, for the purpose specified.

6. The slotted loops E, constructed, as described, with the arms *f* and slotted raised base H for attaching the teeth to the axle or rake-head.

JAMES E. WISNER.

Witnesses:
A. B. BRADLEY,
S. P. MORSE.